March 20, 1928. Re. 16,910
T. W. CASE
TALKING PICTURE MACHINE
Original Filed July 24, 1926
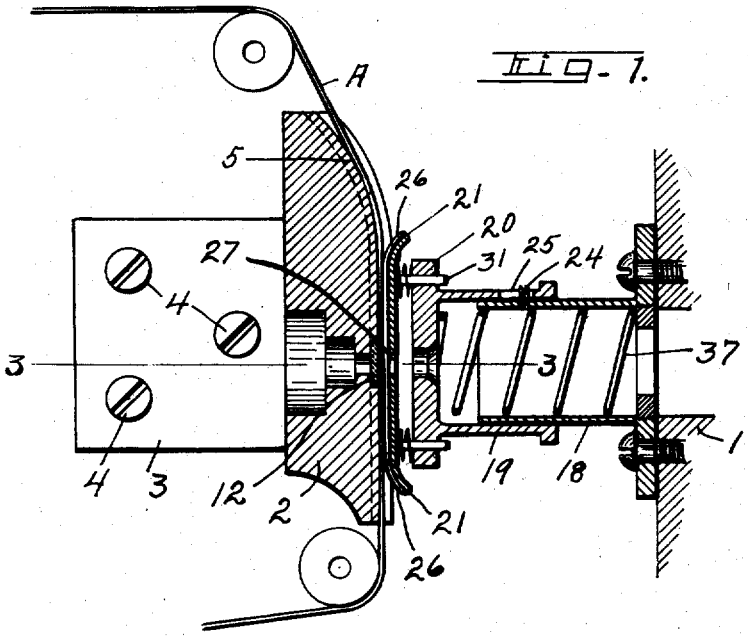
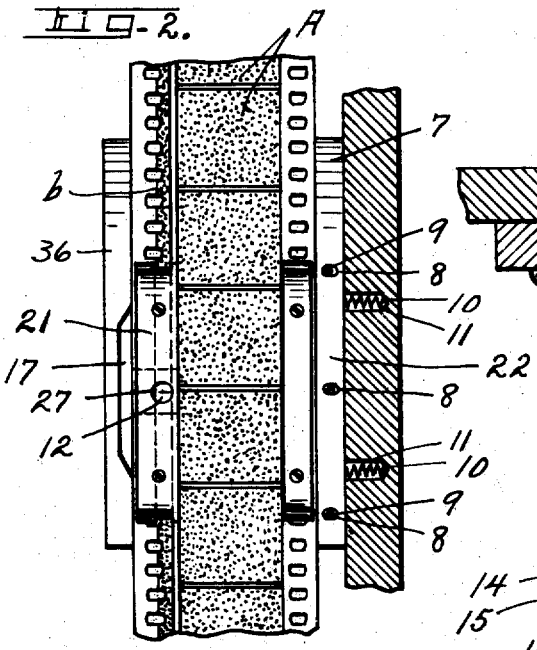
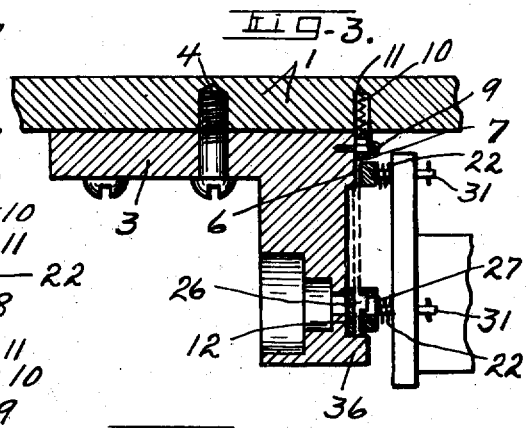
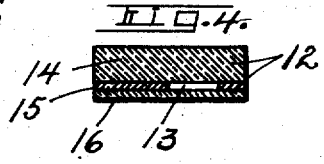
WITNESS
C. J. Shepard
INVENTOR
Theodore Willard Case
BY Denison & Thompson
ATTORNEYS Reissued Mar. 20, 1928. Re. 16,910

UNITED STATES PATENT OFFICE.

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK.

TALKING-PICTURE MACHINE.

Original No. 1,638,393, dated August 9, 1927, Serial No. 124,723, filed July 24, 1926. Application for reissue filed October 4, 1927. Serial No. 223,984.

This invention relates to certain new and useful improvements in talking picture machines.

In the production or reproduction of a film record corresponding to sound wave variations, it is essential that the film should move in close relation with the slit through which the film is exposed to light rays, and the main object of this invention is the production of a structure in which the film is pressed or held tightly against the track or tracks of the slit containing unit or structure, while at the same time the portion of the film constituting or adapted to constitute the sound record portion is not exposed to frictional or sliding contact with the member or members which maintain the film against the track or tracks, whereby the possibility of injuring the record is eliminated.

The maintenance of the sound record portion of the record element, as a negative, or a positive produced therefrom in uniform and smooth relation with the supporting track, is effected by the use of two shoes, or in this illustration flanges disposed upon opposite sides of the sound record portion of said element, and bearing against the film, negative or positive upon opposite sides of the sound record, so as to effect the desired result without contact of the shoes with the sound record portion of said element.

Other objects and advantages relate to the details of the structure and the parts thereof, all as will more fully appear from the following description, taken in connection with the accompanying drawings, in which:

Figure 1 is an elevation partially in section of an apparatus of this invention.

Figure 2 is a section on line 2—2, Figure 1.

Figure 3 is a section on line 3—3, Figure 1.

Figure 4 is a detail of the slit unit.

The apparatus as here illustrated comprises a moving picture machine, a portion of which is illustrated at —1— combined in this instance with a replaceable talking picture unit including a fixed slit unit of desired construction. The replaceable talking picture unit comprises a body section —2— including a flange —3—, in this instance extending at substantially right angles to the body and formed with a plurality of openings for the reception of screws —4—, three being illustrated in this instance, and which are adapted to be threaded into openings in the wall —1— of the moving picture machine.

The body section —2— further includes longitudinally extending tracks —5— and —6—, in this instance spaced apart and elevated above the central portion of the body —2— and longitudinally extending lateral guides —6— and —7— disposed upon opposite sides of and elevated above the respective tracks —5— and —6— and upon which tracks the film A is adapted to ride between the guides —36— and —7—.

One of these guides as —7— is preferably laterally movable with respect to the body —2— so as to tightly engage the adjacent edge of the film A and hold the opposite edge in contact with the guide —36—. For this reason the guide —7— is formed with laterally extending slots —8— adapted to receive screws —9— which extend into openings in the body, and as the strip —7— lies in substantial contact with the wall —1—, this wall is formed with one or more recesses —10— adapted to receive coil springs —11— which bear against the outer edge of the guide —7— and tend to force it inwardly toward the guide —36— so that the film will at all times be tightly confined between the guides.

The track —5— in this illustration is formed with a recess within which there is secured by cementing or otherwise, a slit unit —12— or a member containing an elongated extremely narrow slit —13—, the body —2— being formed with a comparatively large opening underlying the slot so that light rays from a suitable source may pass through the body and the slot to the film. This slit unit may preferably be constructed of a base plate —14— of a transparent material, such as glass, having deposited thereon in vaporized form or in the form of minutely subdivided particles an extremely thin layer —15— of opaque material, such as a metal-like silver, and in this opaque layer —15— the slot —13— is ruled. An extremely thin cover glass —16— is then secured by such a material as Canada balsam permanently in place over the slot —13—, and is preferably of a size substantially equal to the size of the base plate —14— so as to form a symmetrical unit.

This unit is placed in the recess formed in the track —5— adapted to receive it, and the recess is preferably of such a size that the slit unit fits it, and the surface of the cover glass —16— is flush with the surface of the track.

This slit unit constitutes a means for limiting the area of the record-element, exposed to light rays at any time to an elongated narrow line so that there continuously passes to the film a slit of light or a narrow elongated line of light.

In order to prevent the accumulation of dirt and foreign matter at the juncture of the guide —36— and track —5— at a point adjacent the slit —13—, the guide —36— is cut away at its inner edge so as to form a lateral recess —17— which preferably extends some distance upon opposite sides of the slit unit —12— and the floor of this recess is flush with and forms a continuation of the track —5— so that there is no angular part at points adjacent the slit unit to collect dirt or foreign matter.

Means is provided for holding the film in tight contact with the tracks —5— and —6—, and in this illustration that means takes the form of telescoping tubes —18— and —19—, one of which as —18— is connected at its base by screws or otherwise to the wall —1— of the moving picture machine, and the other section, such as —19— carries at its forward end a plate —20—, which plate in turn carries a plurality of, in this instance two, shoes —21—, one for pressing the film into contact with each of the tracks —5— and —6—, and the shoe which is adapted to hold the film in contact with the track —5— is formed with a longitudinal groove —26— extending throughout substantially the entire length of the shoe and registering with or overlying the narrow portion —*b*— of the film which contains the record corresponding to sound wave variations so that the portion —*b*— of the film in passing beneath the shoe —21— does not contact with the shoe, but the flanges —50— and —51— upon opposite sides of the groove or channel —26— bear against the film at the opposite edge of the sound record and hold the film in tight contact with the track —2—.

The flanges —50— and —51— constitute in effect shoes spaced apart a distance substantially equal to the width of the sound record portion of said element and bearing against the element upon opposite sides of said sound record portion to maintain the record element in flat and uniform contact with the track —5—.

At a point overlying the slit 13 the base of the groove or channel —2— is formed with an opening 27 here shown as of circular form, altho the form and size may be varied. The shoes —21— are supported from the plate —20— by means of pins —31— secured to the shoes and extending through the plate in a slidable manner, springs —22— being mounted on the pins beneath the shoes and the plate so that the shoes are urged by respective springs toward the tracks —5— and —6— to resiliently hold the film in contact with the tracks.

The telescoping tubes —18— and —19— are slidably secured together by means of stud —24— secured to the tube —18— and extending outwardly therefrom and positioned in an elongated slot —25— in the tube —19—.

With this construction the film is held in tight contact with the tracks —5— and —6— and the longitudinal channel or groove —26— in the shoe —21— permits the passage of the sound record beneath the shoe without frictional or sliding contact of the shoe with the effective portion of the sound record, while the opening —27— through the base of the channel or groove at a point registering with or overlying the slit —13— permits the passage of light rays to and from the film.

The shoe —22— and the flange or shoe —50— contact with opposite edges of the record element and hold it in contact with the respective tracks —6— and —5—, while the flange or shoe —51— is in effect a third shoe disposed between the two first-named shoes and spaced from the shoe —50— a distance substantially equal to the width of the sound record portion of the element and assisting in holding the record element in contact with the track —5—.

The novel features of the structure here disclosed, except those specifically relating to the longitudinal groove —26— in the shoe forming in effect two shoes —50— and —51— and the opening —27— in the base of said groove or channel in combination with the other cooperating parts of the structure are claimed in my copending application Serial No. 95,593 filed March 18, 1926, for talking moving picture machines, and altho I have shown and described a specific form of structure as constituting a perhaps preferred embodiment of this invention, I do not desire to restrict myself to the details of the structure or the form thereof, as various changes and modifications may be made within the scope of the appended claims.

I claim:

1. A talking picture apparatus for use in connection with a film having a narrow sound record near one edge of the film comprising a body portion having tracks at opposite sides upon which the film is adapted to ride, and a shoe for holding the film in contact with one of said tracks and having an elongated groove adapted to overlie the sound record portion of the film, a slit unit in the last-named track, and said shoe having an opening leading to the groove and registering with said slit unit.

2. A talking picture apparatus for use in connection with a film having or adapted to have a narrow sound record near one edge of the film comprising a body portion having tracks at opposite sides upon which the film is adapted to ride and a shoe for holding the film in contact with one of said tracks and having an elongated groove adapted to overlie the sound record portion of the film so as not to contact with this portion of the film, the ends of the side wall upon opposite sides of the groove contacting with the film near opposite sides of the sound record, a slit unit in the last-named track and said shoe having an opening leading to the groove and registering with said slit unit to permit the passage of light rays.

3. In an apparatus for producing or reproducing sound pictures in connection with a film having or adapted to have a narrow sound record near one edge of the film, a body portion having tracks at opposite sides upon which the film is adapted to ride, and a shoe for holding the film in contact with one of said tracks and having an elongated groove adapted to overlie the sound record portion of the film, means permitting the passage of a line of light to the film through the base, and said shoe having an opening leading to the groove and registering with said means.

4. In an apparatus for producing or reproducing sound pictures in connection with a film having or adapted to have a narrow sound record near one edge of the film, a body portion having tracks at opposite sides upon which the film is adapted to ride, and a shoe for holding the film in contact with one of said tracks and having an elongated groove adapted to overlie the sound record portion of the film so as not to contact with this portion of the film, the flanges or shoes upon opposite sides of the groove adapted to contact with the film near opposite sides of the sound record, means permitting the passage of a line of light to a film upon said tracks and said shoe having an opening leading to the groove and registering with said means to permit the passage of light rays.

5. In an apparatus for producing or reproducing sound pictures, a base having a pair of spaced tracks over which the record element is adapted to move, means for holding the sound record portion of said element in contact with one of said tracks comprising a pair of spaced shoes overlying the said track and contacting with the element on opposite sides of the sound record portion of the same, and means permitting the passage of a line of light to the element.

6. In an apparatus for producing or reproducing sound pictures, a base having a pair of spaced tracks over which the record element is adapted to move, means for holding the sound record portion of said element in contact with one of said tracks comprising a pair of spaced shoes overlying the said track and contacting with the element on opposite sides of the sound record portion of the same, means permitting the passage of a line of light to the element, and an additional shoe for holding the other edge of a record element in contact with the other track.

In witness whereof I have hereunto set my hand this 29th day of September, 1927.

THEODORE WILLARD CASE.